ELECTRICAL MUSICAL INSTRUMENT
Original Filed April 30, 1962 2 Sheets-Sheet 1
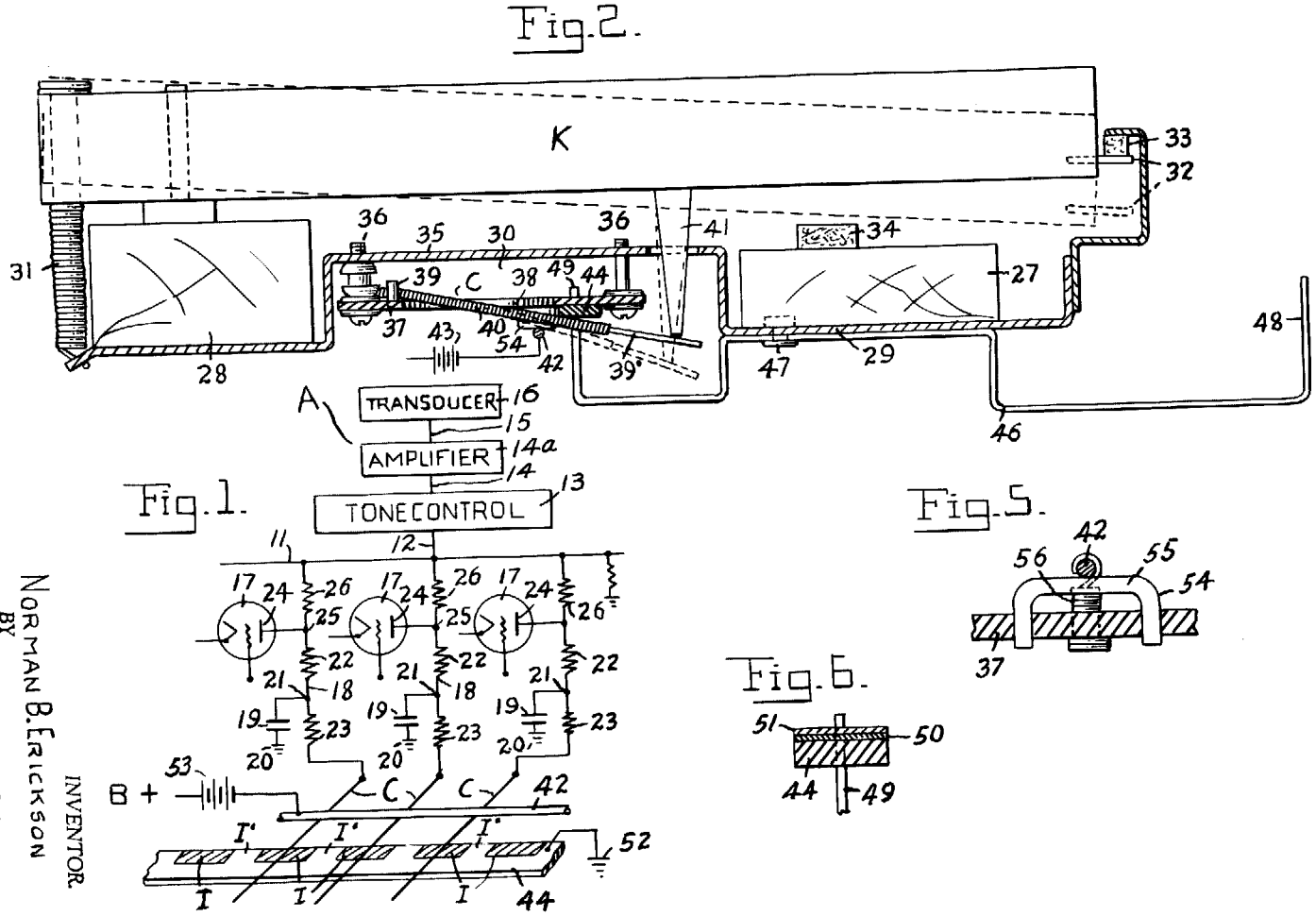
INVENTOR.
NORMAN B. ERICKSON
BY
James A. Koehl
Atty.

ELECTRICAL MUSICAL INSTRUMENT
Original Filed April 30, 1962 2 Sheets-Sheet 2
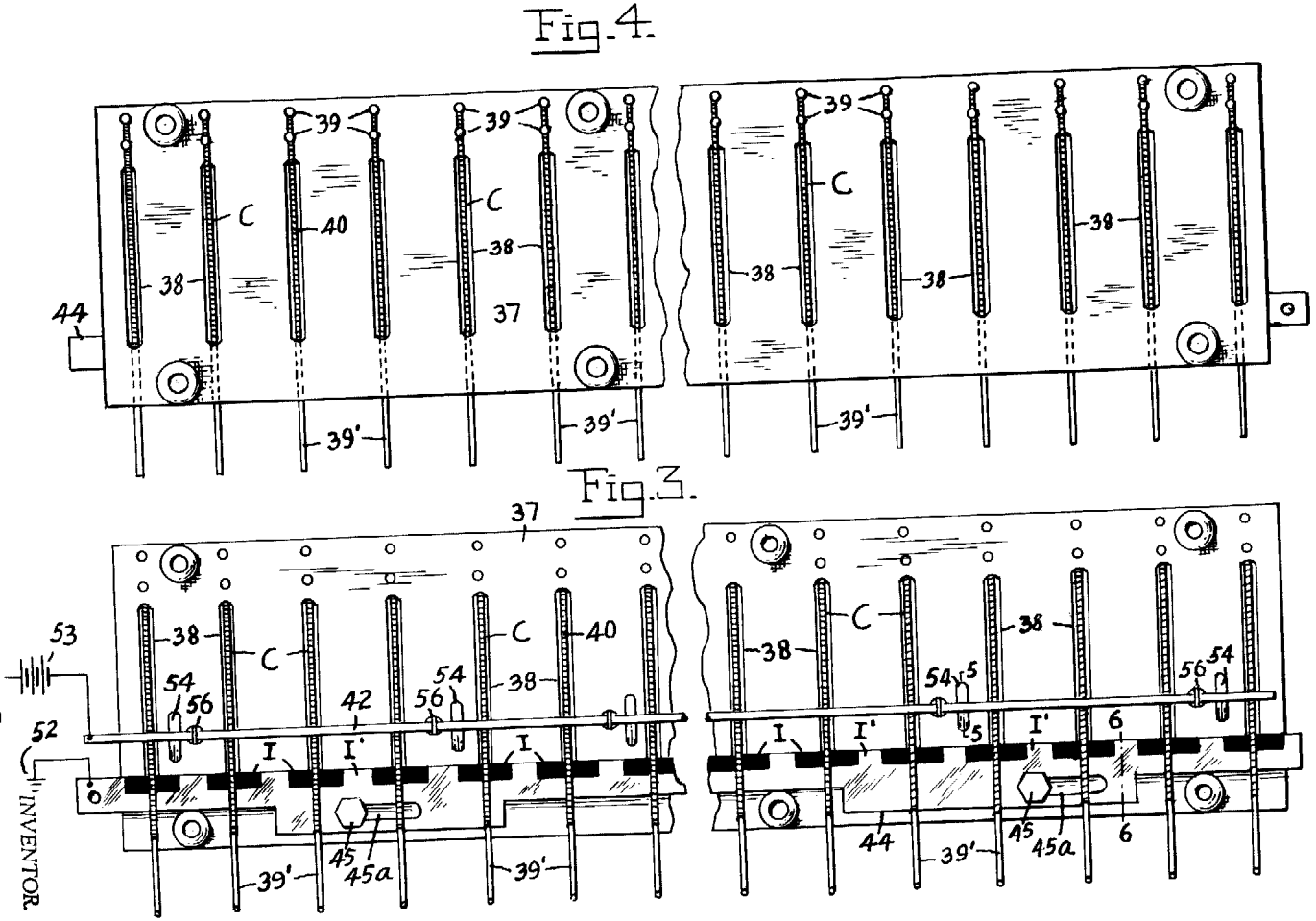

United States Patent Office

Re. 26,048
Reissued June 28, 1966

26,048
ELECTRICAL MUSICAL INSTRUMENT

Norman B. Erickson, Des Plaines, Ill., assignor to Chicago Musical Instrument Company, Cook County, Ill., a corporation of Illinois Original No. 3,139,477, dated June 30, 1964, Ser. No. 190,857, Apr. 30, 1962. Application for reissue Jan. 4, 1965, Ser. No. 437,336
7 Claims. (Cl. 84—1.26)

Matter enclosed in heavy brackets [ ] appears in the original patent but forms no part of this reissue specification; matter printed in italics indicates the additions made by reissue.

This invention relates to electronic musical instruments of the class employing capacitative-resistive keyer-circuits for controlling as a function of time voltage supplied a loud speaker from tone signal generators. It is well known that the time in seconds required to charge a condenser through a resistance is approximately equal to the product of the capacity in farads and the resistance in ohms. Thus, in capacitative-resistive keyer-circuits both the rate of growth and the rate of decay of signal voltage supplied a loud speaker can be calculated so that the rate of attack and the rate of decay of sound can either be the same or they may be different relative to each other. In no case has it been possible with instruments of the prior art to prevent the discharge of condensers by economical procedures to enable sustaining sound following depression and let-go of the keys of the instrument's keyboard.

An object of my invention is the provision of electromechanical means actuable from the console of the instrument and selectively functioning to interrupt an otherwise normal operation of the capacitative-resistive keyer-circuits and prevent discharge of the condensers in said circuits and decay of signal voltage supplied a loud speaker in order that sound can be sustained following "let-go" of the keys of the keyboard and return of the keys to raised positions.

A still further object is the provision of a device, an essential manually actuable circuit controlling element of which is common to all keys of a keyboard and is the resultant product of printed circuit technics.

Referring to the drawings:

FIGURE 1 is a block diagram showing the invention incorporated in the capacitative-resistive keyer-circuits of the signal transmission network of an electronic organ.

FIGURE 2 is a view partly in elevation and partly in section of the invention applied to the keyboard bed of the organ.

FIGURE 3 is a plan view of a portion of the contactor assembly and sound sustension control device.

FIGURE 4 is a view similar to FIGURE 3 looking toward the opposite side of the contactors assembly and sound sustension control device.

FIGURE 5 is a section taken on line 5—5 of FIGURE 4, and FIGURE 6 is a section taken on line 6—6 of FIGURE 4.

Referring to FIGURE 1, the conventional signal transmission network 10 comprises a tone signal output conductor 11 connected by wire 12 to a tone control 13 of an output system A. Tone control 13 is coupled by wire 14 to an audio amplifier 14a, the latter coupled by wire 15 to an electroacoustic transducer 16 such as a conventional loud speaker. The tone generators 17 may be of any well known type adapted to produce acceptable waveforms of output tone signals which may be withdrawn and delivered to the tone control 13 when the generators are activated from a source to supply thereto B+ potential.

Each generator 17 is connected in a capacitative-resistive keyer-circuit 18 embodying a condenser 19, connected to ground from the junction point 21 between resistors 22 and 23, and, as shown, the anodes 24 of said generators connect to the keyer-circuits at the junction points 25 between resistors 22 and 26. Assuming that the generators are operating, each at the frequency of a given note of the scale, signals can be withdrawn therefrom and supplied the output system A upon impressing B+ potential on said anodes 24. By this disclosed arrangement of the above named elements, the amount of signal voltage supplied the output system A will be at a rate determined by the values of the resistors 22, 23, and 26 and the size of the condensers 19, the amount of the voltage respectively increasing and decreasing as the condensers charge and discharge, thereby controlling as a function of time the growth and decay of sound occurring at said output system A.

At FIGURE 2, a depressible key K is supported upon a keybed which comprises longitudinally extending front and rear rails 27 and 28 connected to each other by a metal frame 29, the latter having an intermediate channel section 30. The rear end of key K is connected to the frame 29 by a coil spring 31 to normally bias the front end of the key to the upper limit of its motion where the stop 32 on the key engages a cushion 33 at the front of said frame. Rail 27 has a cushion 34 situated so as to limit motion of the key when it is fully bottomed.

Rigidly suspended from the horizontal wall 35 of the channel section 30 of frame 29 by bolts 36, is a flat strip 37 of hard electrical insulating material. As shown in detail at FIGURES 3 and 4, the strip 37 has a longitudinal series of equi-distantly spaced apart transversely disposed rectilinear slots 38. Soldered at their rear ends to binding posts 39 on strip 37 are contactors C, each consisting of a straight length of steel wire 39' providing a resilient core about which, small gauge wire 40 is closely wound to form a rough resilient covering for the core wire 39', said covering terminating short of the free end of said core wire. These contactors pass downward through the respective slots 38, the free ends of the core wires 39' terminating forwardly of said strip 37. This method tensions the contactors so that said free ends of the core wires tend always to move in an upward direction. At FIGURE 2, key K has a depending actuator 41 whose lower end freely engages the free end of a respective core wire 39'.

A conductor 42 underlies the contactors C rearwardly of the free extremity of core wire 39', said conductor being connected to a source 43 of B+ potential. When key K is depressed, actuator 41 presses upon the free extremity of contactor C to engage same with conductor 42 and energize same from said source 43. Referring now to FIGURE 1 where each keyer-circuit 18 connects to a respective contactor C, it is appreciated that when a selected contactor is engaged with the conductor 42, B+ potential will be conducted to a respective circuit 18 to charge an associated condenser 19 and apply B+ potential to the anode 24 of a respective generator 17, thereby activating the anode for withdrawing signal voltage from the generator and effecting delivery thereof to the output system A for translation of said voltage into sound.

A rectilinear strip 44 of hard electrical insulating material is connected to strip 37 by bolts 45 which pass through enlongated slots 45a in said strip 44 enabling the strip to slide a limited distance longitudinally either to the right end of strip 37 or to the left end thereof as will be better understood upon reference to FIGURE 3. Strip 44 is positioned close to the front edge of strip 37 and extends transversely of the slots 38 through which the contactors C extend. A lever 46 is pivoted at 47 to the frame 29 and has a manipulating extension 48 for use by the player, and an operating extension 49 coactive with strip 44 to impart sliding motion thereto.

Referring to the block diagram FIGURE 1 where the conductor 42 is disposed above contactors C instead of below the contactors as shown at FIGURE 2 and strip 44 is shown beneath the contactors as distinguished from its being above the contactors as at FIGURE 2, it is noted that said strip 44 has a longitudinal row of equi-distantly spaced apart non-conductive islands I, there being one thereof for each keyer circuit 18. Except for these non-conductive islands the surface of strip 44 that confronts the contactors is electrically conductive and is of a configuration providing conductive islands I' in the spaces intervening between the respective non-conductive islands I. This provides for each keyer-circuit one conductive island I' and one non-conductive island I. At FIGURE 6, one face of the strip is plated with copper 50 to form the conductive islands. Applied to the copper coated surface is a coating of silver 51. The conductive islands merge into each other and are connected to ground 52. Conductor 42 connects to a source 53 of B+ potential. With contactors C on the non-conductive islands I, and assuming that the condensers 19 are charged, the keyer circuits will remain charged, causing sustension of sound at output system A.

Attached to strip 37 are longitudinally spaced apart metallic members 54 of staple configuration providing seats 55 disposed in the same spaced relation to the lower side of said strip. Conductor 42 crosses the seats and resiliently closely engages the seats by means of coil springs 56 attached to strip 37 as shown at FIGURE 5. Said seats are, in effect, spacers functioning to dispose the conductor 42 in the same spaced relation to the respective contactors C so that the contactors are responsive to the same depth of depression of the keys of the instrument's keyboard.

Having fully described the invention, I point particularly to the combination of elements including strips 37 and 44, on the former of which the contactors are mounted and disposed to selectively engage either the electrically conductive islands I' or the electrically non-conductive islands I according as it is desired either to charge condensers 19 or prevent discharge thereof. This combination provides a simple and economical unitary structure which may be readily connected in the signal generating and transmission circuitry of an electronic organ, and whereby the contactors C will be disposed for operation by the keys of the instrument.

The values of the herein referred to electrical components are:

| | |
|---|---|
| Resistors— | |
| **22** | 1.5M |
| **23** | 15K |
| **26** | 4.7M |
| Condensers— | |
| **19** mfd | .22 |

What I claim is:

[1. An electrical musical instrument comprising, an output system having an electroacoustic transducer, generators producing tone signals of different musical frequencies, capacitative-resistive keyer-circuits connecting the generators to said output system for controlling as a function of time the rate of growth and decay of signal voltage supplied the output system in response to activation of said circuits, and non-conductive means selectively insertable in said circuits to prevent decay of signal voltage supplied said output system and cause sustension of sound at said transducer.]

[2. An electrical musical instrument according to claim 1 wherein a common electrical conductor is connected to a source of positive potential and the keyer-circuits are each provided with a contactor respectively engageable with said common conductor and said non-conductive means.]

[3. An electrical musical instrument according to claim 2 in which the non-conductive means comprises a manually actuable member of hard electrical insulating material having longitudinally spaced apart conductive surfaces for concurrently engaging the contactors when said contactors are disengaged from said common conductor, and wherein said member has interconnected electrically conductive surfaces in the spaces between said non-conductive surfaces, the same connected to ground and adapted to respectively engage the contactors when the latter are disengaged from said common conductor.]

[4. An electrical musical instrument comprising, an output system having an electroacoustic transducer, generators producing tone signals, resistive-capacitance keyer-circuits connecting the generators to the output system for controlling as a function of time the growth and decay of sound emitted by said transducer, each keyer circuit having a control contactor, a common conductor with which the contactors are selectively engageable, a source connected to supply positive potential to said common conductor for activation of said keyer circuits via said contactors, electrically conductive means for selectively connecting said keyer circuits to ground to cause decay of signal voltage delivered to the output system, and electrically non-conductive means selectively connectible in said circuits to block same against decay of signal voltage delivered to the output system and cause sustension of sound at said transducer.]

[5. An instrument according to claim 4 wherein the respective electrically conductive means and the electrically non-conductive means include a manually actuable member supported for movement enabling either one of said means to be disposed for coaction with said contactors.]

[6. An instrument according to claim 4 in which the respective electrically conductive means and the electrically non-conductive means include a member of hard electrical insulating material having exposed portions providing the non-conductive means and metal plated surfaces providing the electrically conductive means.]

7. An electrical musical instrument comprising, an output system having an electroacoustic transducer, tone generators, capacitative-resistive keyer-circuits connecting the generators to the output system, a source of electrical energy connected with the keyer-circuits to conduct activating potential to said generators and activate same and effect withdrawal of signal voltage therefrom and effect delivery thereof to the output system, and means selectively coactive with all of said keyer-circuits to (1) discharge signal voltage to ground from said output system and said circuits and (2) prevent said discharge.

8. An electrical musical instrument according to claim 7 in which each keyer-circuit has a contactor, and wherein the contactors are mounted on an electrical insulating material having a conductor connected for energization thereof from said source of electrical energy and is disposed enabling engagement of the contactors therewith, and wherein the selectively coactive means is mounted on said material for manual adjustment to respectively enable said discharge of potential and prevent said discharge.

9. *An electrical musical instrument comprising, an output system having an electroacoustic transducer, generators producing tone signals of different musical frequencies, capacitative-resistive keyer-circuits connecting the generators to said output system for controlling as a function of time the rate of growth and decay of signal voltage supplied to the output system in response to electrical activation of said circuits, means selectively insertable in said circuits to respectively prevent decay of signal voltage supplied said output system and cause sustention of sound at said transducer, a common electrical conductor connected to a source of positive potential, said keyer-circuits having contactors respectively engageable with said common conductor, said selectively insertable means comprising; an adjustable member of hard electrical insulating material formed to provide longitudinally spaced apart non-conductive surfaces and interconnected elec-*

*trically conductive surfaces in the spaces between said non-conductive surfaces and connected to ground, said non-conductive surfaces disposed and adapted to be concurrently engaged with the respective contactors when the contactors are disengaged from said common conductor and the member is in one possible condition of adjustment, said electrically conductive surfaces disposed and adapted to concurrently engage the respective contactors when the contactors are disengaged from the common conductor and the member is in another possible condition of adjustment.*

*10. In an electrical musical instrument, an electrical network having therein generators producing tone signals of musical frequency, an electroacoustic transducer, a common conductor energized from a source of positive potential, resistive-capacitative keyer-circuits coupled to the respective generators and each having a depressible playing-key operated circuit making and breaking contactor related to said common conductor to respectively engage and disengage same and serving when engaged therewith to impress positive potential on said resistive-capacitative circuits to polarize same and thereby charge said circuits and also to cause activation of the generators for withdrawing signal voltage therefrom and transmitting said voltage to the transducer as a function of time to control the rate of growth and decay thereof at the transducer; electrically non-conductive means selectively engageable with the contactors to block discharge of said keyer-circuits and cause sustention of sound at the transducer when the keys are raised and the contactors thereof are disengaged from said common conductor; and electrically conductive means connected to ground and engageable with the contactors when same are disengage from said common conductor so as to discharge said keyer-circuits and cause gradual decay of sound at said transducer.*

*11. A musical instrument according to claim 10 wherein the respective electrically non-conductive and electrically conductive means comprise a selectively adjustable member of hard electrically non-conductive material having a longitudinally disposed series of*

*spaced apart electrically conductive surfaces respectively engageable with the contactors when the member is in one condition of selected adjustment, and a longitudinal series of exposed portions of the material of said member occupying the spaces between said electrically conductive surfaces and engageable with the contactors when the member is in another condition of selected adjustment.*

*12. A musical instrument according to claim 11 wherein the electrically conductive surfaces are coatings of a metallic solution printed on said member.*

*13. A musical instrument according to claim 10 wherein the common conductor is disposed in spaced parallel relation to the respective electrically non-conductive and electrically conductive means of said member and the contactors extend transversely thereof and through the space between said respective means and the common conductor and are resiliently biased to disengage the common conductor when the playing-keys are raised and to operatively correlate the contactors with said member.*

References Cited by the Examiner

The following references, cited by the Examiner, are of record in the patented file of this patent or the original patent.

UNITED STATES PATENTS

| | | |
|---|---|---|
| 2,487,977 | 11/1949 | Larsen et al. |
| 2,848,919 | 8/1958 | Hanert. |
| 2,924,784 | 2/1960 | Peterson. |
| 2,941,433 | 6/1960 | McKellip. |
| 2,949,803 | 8/1960 | Leslie. |
| 3,038,365 | 6/1962 | Peterson. |

FOREIGN PATENTS

| | | |
|---|---|---|
| 1,111,488 | 7/1961 | Germany. |

ARTHUR GAUSS, *Primary Examiner.*

D. D. FORRER, *Assistant Examiner.*